Inventor
Harvey W. Rockwell
By Charles C. Schmal
Attorney

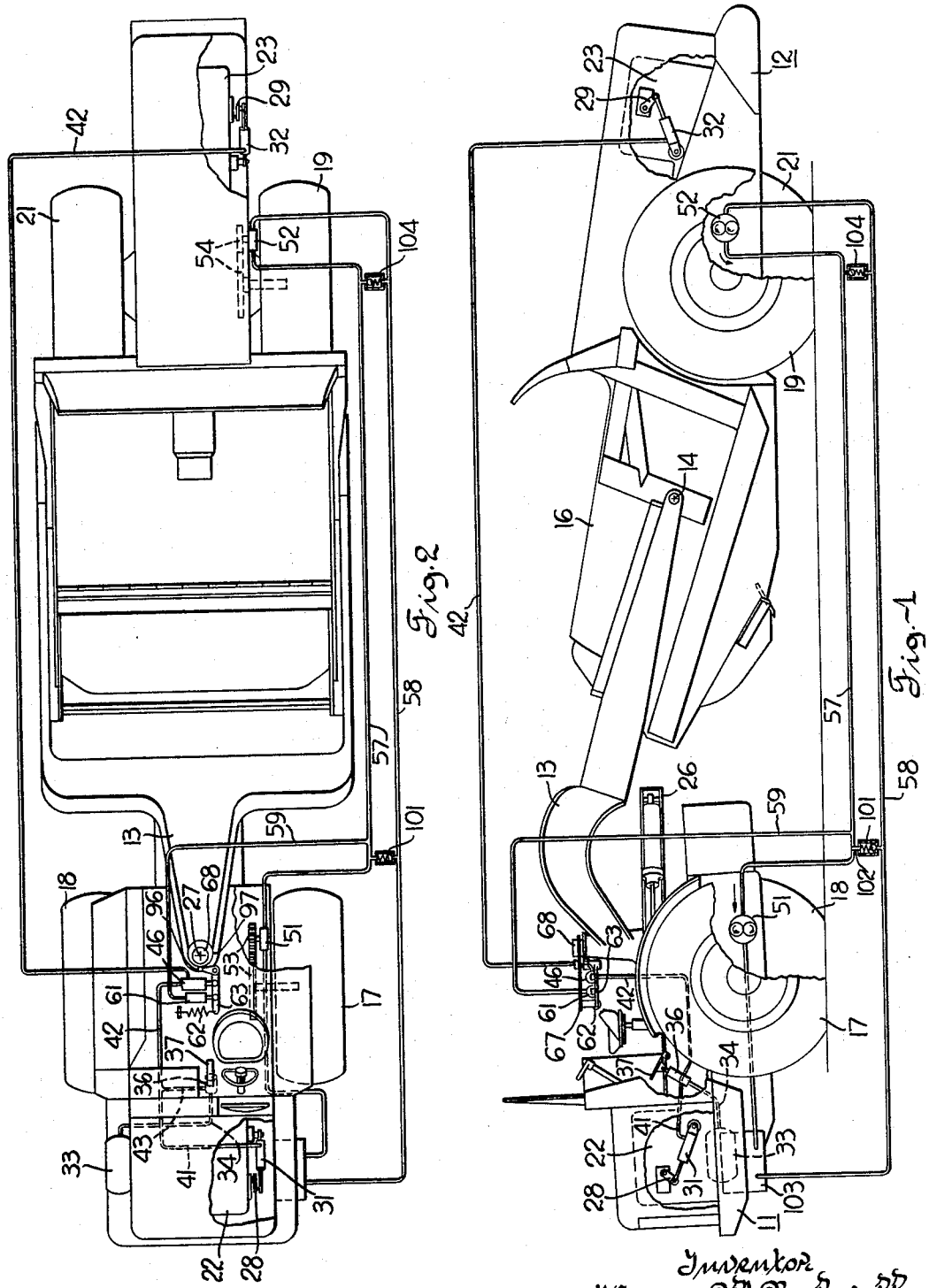

United States Patent Office 3,263,767
Patented August 2, 1966

3,263,767
VEHICLE WHEEL SPEED CONTROL MECHANISM
Harvey W. Rockwell, Cedar Rapids, Iowa, assignor to Allis-Chalmers Manufacturing Company, Milwaukee, Wis.
Filed June 23, 1964, Ser. No. 377,186
9 Claims. (Cl. 180—77)

This invention relates to a vehicle having front and rear traction means driven by independent power means and particularly to automatically controlling the speed of the rear power means.

It is an object of this invention to automatically prevent the speed of the rear traction means from overrunning the speed of the front traction means in a vehicle of the type having independent driving means for the front and rear traction means.

It is a further object of this invention to provide means for synchronizing the speed of the rear traction means of a vehicle to that of its front traction means and for reducing the speed of the rear traction means when the vehicle is steered to a predetermined extent from a straight ahead driving position.

It is a further object of this invention to provide a structure of the hereinbefore mentioned type which includes a pair of loop connected fluid pumps driven by the front and rear traction means, respectively, and wherein the pressure variations in the fluid passage connecting the output of the rear pump to the input of the front pump is used for controlling the speed of the rear engine so that the front and rear traction means have the same speed, even though torque converters of different slip characteristics are used in their respective drive trains.

These and other objects of this invention will be apparent when the following description is read in conjunction with the drawings in which:

FIG. 1 is a side view of a vehicle incorporating this invention;

FIG. 2 is a top view of the vehicle shown in FIG. 1;

Figure 3:
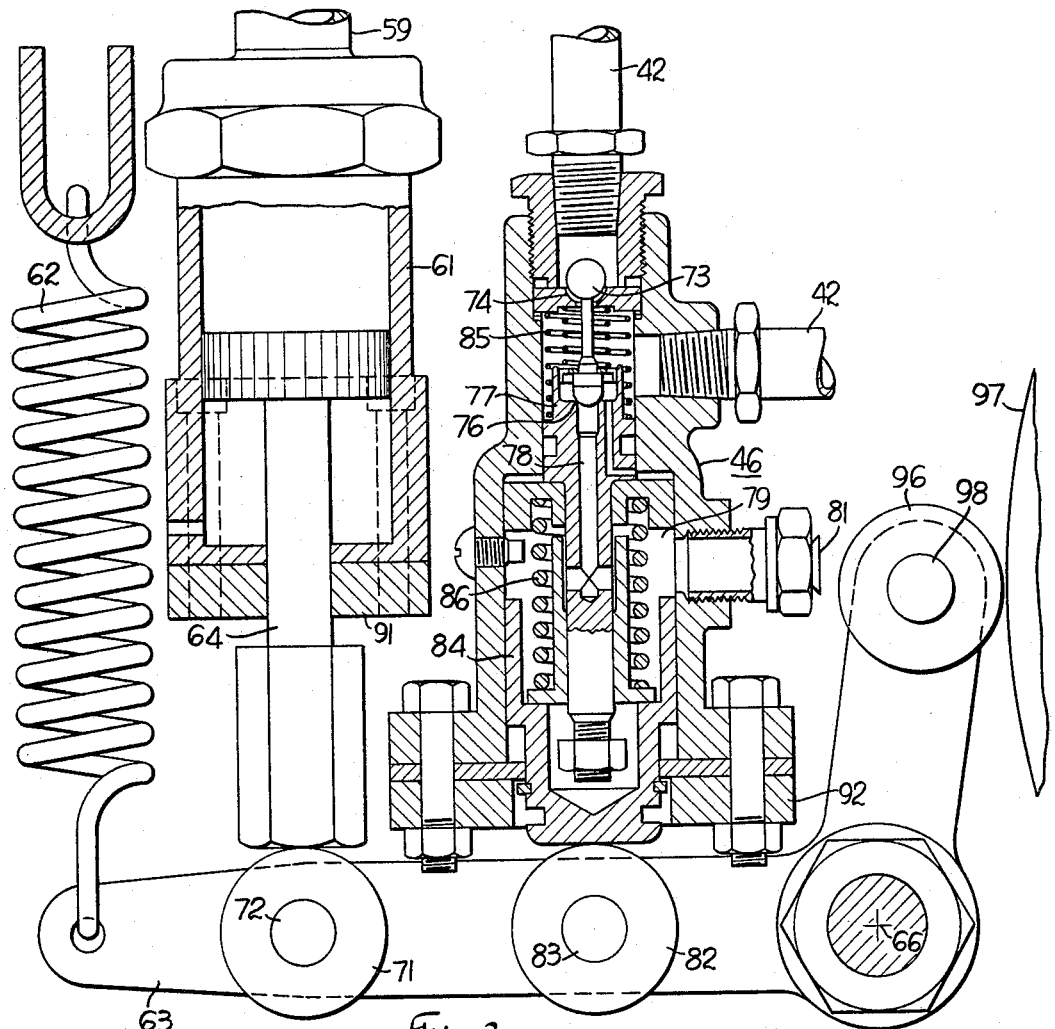
FIG. 3 is a top section view of a portion of the control system of this invention including an air control valve and hydraulic jack.

Referring to FIGS. 1 and 2 my invention is incorporated in an earthmover which has a chassis including a front unit frame 11, a rear unit frame 12 and a draft frame 13. The rear unit frame 12 includes a bowl 16 and is pivotally connected on a transverse axis 14 to a draft frame 13. The front frame 11 is part of a two wheel tractor including ground engaging traction means in the form of a pair of driving wheels 17, 18. Rear frame 12 is supported and driven by rear ground engaging means in the form of wheels 19, 21. The front wheels 17, 18 are driven by power means in the form of an internal combustion engine 22 connected in a conventional manner to wheels 17, 18. A rearwardly disposed power means in the form of an internal combustion engine 23 is connected through a drive train of a conventional type to the rear driving wheels 19, 21. The front two wheeled tractor is articulately steered about a vertical axis 27, relative to the frame member 13, by steering means 26.

A speed controller in the form of an adjustable fuel control member 28 is provided on the front engine 22 and a similar speed controller 29 is provided on the rear engine 23. Fluid operated actuators in the form of air cylinders 31, 32 are connected to the speed controllers 28, 29, respectively, and an air supply and control system is provided for operating the air cylinders 31, 32 which includes an air reservoir 33 connected through conduit 34 to an air valve 36 operated by accelerator pedal 37. The air cylinders or actuators 31, 32 are connected to the valve 36 through air conduits 41, 42 and a trunk conduit 43. A secondary air control valve 46 is disposed in conduit 42 between the accelerator pedal control valve 36 and rear engine to modify the air pressure to the fuel controlling actuator 32. The modification of pressure in actuator 32 is achieved automatically in response to overspeeding of rear wheels 19, 21 and effects reduced rear engine speed.

One of the purposes of this invention is to synchronize the wheel speed of the front and rear driving units to negate wheel slippage and accompanying excessive tire wear. This I accomplish automatically by adjusting the secondary control valve 46 in response to pressure buildup between a pair of series connected fluid pumps 51, 52. The pumps 51, 52 are connected in driven relation to the front and rear traction means, respectively, through suitable gearing 53, 54. This driving relation between the wheels and pumps 51, 52 is commonly referred to as a "ground driven" condition. A first fluid passage 57 connects the output of pump 52 to the input of pump 51 and a second fluid passage 58 connects the output of pump 51 to the input of pump 52. Fluid passage means in the form of a third passage 59 connects the first passage 57 to a fluid operated jack 61. Upon the speed of the rear pump 52 exceeding the speed of the front pump 51, a pressure rise in passage 57 occurs causing jack 61 to expand thereby effecting control of the secondary air valve 46 to achieve reduction in rear engine speed.

Figure 4:
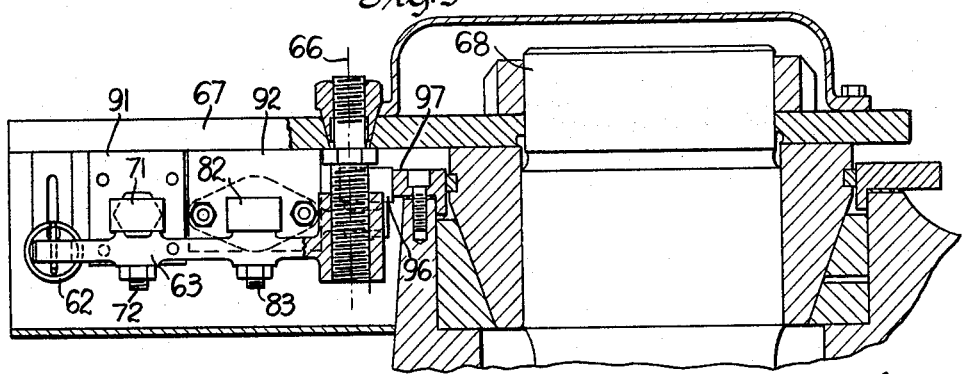
FIG. 4 is a side view of the components shown in FIG. 3.

Referring also to FIGS. 3 and 4 the hydraulic jack 61, upon being subjected to a predetermined fluid pressure, will overcome the action of biasing means or tension spring 62 and move bell crank 63 with consequent control of secondary valve 46. The bell crank 63 in serving as an actuating element for valve 46, pivots about the axis 66 of its pivot connection with a plate 67. Plate 67 is rigidly secured to upstanding king pin 68 of the front two wheel tractor. The king pin does not rotate relative to the front frame 11 about a vertical axis. The piston rod 64 of jack 61 has a thrust transmitting connection with a roller 71 which is pivotally connected by a pin 72 to one arm of the bell crank 63. Upon actuation of jack 61 a shiftable fluid flow controlling element 73 will move into engagement with a cooperating seat 74 thereby cutting off the supply of air pressure to the rear engine actuator 32. At the same time that the outer end of valve element 73 is moving toward its stationary seat 74, the inner end of valve element 73 is moving off its seat 76 formed in a shiftable member 77. As this occurs, air in that portion of the conduit 42 connected to the rear engine actuator 32 is permitted to escape through passage 78, chambers 79 and atmosphere vent 81, thus effecting reduction in the rear engine speed.

A roller 82 is pivotally connected to bell crank 63 by a pin 83 and is in thrust transmitting relation to a shiftable abutment member 84 which in turn acts against member 77 through a coil spring 86. The hydraulic jack 61 is secured by a vertical plate 91 to plate 67 and valve 46 is secured to plate 67 through a vertical plate 92. Plates 91, 92 may be secured to plate 67 by any suitable means such as by welding.

When the vehicle turns to a predetermined extent in one direction or the other from a straight ahead driving position, it is desirable to slow down the rear engine relative to the front engine, since in a motor scraper of the type disclosed the rear wheels will travel in an arc of less radius than the front wheels. Overriding means responsive to the steered condition of the vehicle are provided to adjust the position of the valve element 73 to effect reduced speed of the rear power means 23 when the vehicle has been steered to a predetermined extent. The means responsive to the steered condition includes a pair of camming elements in the form of roller 96, pivoted on an end of bell crank 63 by a pin 98, a curved cam 97 secured to frame 13 in eccentric relation to the pivot axis 27. When the traction means have been steeringly adjusted relative to each other a predetermined extent, the camming surface 97 acts against roller 96 thereby moving the opposite arm of the bell crank downwardly as viewed in FIG. 3 in opposition to the biasing effect of tension spring 62. This shifting movement of the bell crank 63 permits abutment member 84 to move downwardly under the influence of compression spring 86 thereby permitting member 77 to also move downwardly under the influence of the air pressure and compression spring 85. This movement in turn permits valve element 73 to close on seat 74 and move off of seat 76 thereby effecting reduced pressure in the segment of conduit 42 connected to actuator 32. Reducing pressure in actuator 32 effects reduced rear engine speed.

At times it is desired to shut down the rear engine 23 and operate only with the front engine 22. A check valve 101 is provided to bypass fluid through a bypass passage 102, to avoid cavitating the front pump by keeping the conduit 57 full of fluid. Such cavitating would occur without provision of check valve 101 inasmuch as some slippage of power driven wheels is unavoidable and thus the front wheels would have a somewhat higher speed than the nondriving rear wheels. This results in the front pump 51 drawing a partial vacuum thus producing a cavitating condition. The check valve 101 also prevents cavitation of the front pump 51 during turning of the vehicle at which time front pump 51 runs faster than rear pump 52. A reservoir 103 is provided in the second passage 58 and a relief valve 104 is provided between the passages 57, 58 to protect the hydraulic system against excessive pressures.

From the foregoing it is apparent that I have provided a highly desirable control system for a two engine vehicle with individually driven traction means. The pressure change in the passage connecting a pair of ground driven pumps in series is used to reduce the speed of the engine driving the overspeeding wheels and a check valve 101 effectively prevents cavitation of the front pump, when only the front engine is driving the vehicle.

The embodiments of the invention for which an exclusive property or privilege is claimed are defined as follows:

1. A vehicle comprising:
   front ground engaging traction means,
   rear ground engaging traction means,
   first power means connected in driving relation to said front traction means,
   second power means connected in driving relation to said rear traction means, and
   means for adjusting the speed of said second power means relative to said first power means including,
      a first fluid pump connected in driven relation to said front traction means,
      a second fluid pump connected in driven relation to said rear traction means,
      a first fluid passage connecting the input of said first pump to the output of said second pump,
      a second fluid passage connecting the input of said second pump to the output of said first pump,
      an adjustable speed controller on said second power unit,
      means for adjusting said speed controller in response to variations in pressure in said first passage and,
      a bypass for said first pump with a check valve permitting fluid flow therethrough from the output to the input of said first pump and preventing reverse flow, thereby permitting said first traction means to overspeed said second traction means without said first pump being subjected to cavitation.

2. The structure set forth in claim 1 and further comprising relief valve means between said first and second passages permitting fluid flow from said first passage to said second passage at a predetermined relief pressure.

3. The structure set forth in claim 1 and further comprising steering means for steering said vehicle and an overriding control means for moving said speed controller to a reduced speed setting, regardless of fluid pressure in said first passage, in response to said vehicle being steered by said steering means to a predetermined extent from a straight ahead driving condition.

4. A vehicle comprising:
   front ground engaging traction means,
   first power means connected in driving relation to said front traction means,
   rear ground engaging traction means,
   second power means connected in driving relation to said rear traction means,
   means for steering said vehicle,
   an adjustable speed controller for each of said power means,
   a fluid operated actuator connected to each of said controllers,
   a source of pressure fluid on said vehicle,
   a manually operated primary control valve,
   conduit means connecting said source of fluid to said actuators by way of said manually operated control valve,
   a first fluid pump connected in driven relation to said front traction means,
   a second fluid pump connected in driven relation to said rear traction means,
   a secondary control valve in said conduit means intermediate said primary control valve and the actuator for the controller of the power means connected to said rear traction means, said secondary valve having a shiftable fluid flow controlling element,
   a first fluid passage connecting the input of said first pump to the output of said second pump,
   a second fluid passage connecting the output of said first pump to the input of said second pump,
   a fluid operated jack mounted on said vehicle,
   thrust transmitting means in thrust transmitting relation to said jack and said fluid controlling element for moving the latter in one direction in response to actuation of said jack,
   means biasing said jack in the direction opposite to said one direction,
   means connecting said first passage in fluid communication with said jack,
   a bypass passage for said first pump,
   a check valve in said bypass passage permitting fluid fluid flow therethrough from the output to the input side of said first pump and preventing reverse flow through said bypass passage, and
   means responsive to the steered condition of said vehicle to adjust the position of said valve element to effect reduced speed of said second power means when said vehicle has been steered to a predetermined extent from a straight ahead driving condition.

5. The structure set forth in claim 4 and further comprising means relieving the pressure in said one passage upon the pressure therein exceeding a predetermined valve.

6. The structure set forth in claim 4 wherein said thrust transmitting means includes an actuating element shiftably mounted on said vehicle and said means responsive to the steered condition of said vehicle includes a pair of camming elements one of which is connected to said actuating element.

7. The structure set forth in claim 6 wherein said actuating element is a bell crank pivoted on said vehicle and said one of said camming elements is a roller journaled on one end of said bell crank.

8. The structure set forth in claim 7 wherein said means biasing said jack includes a spring interconnected between said vehicle and said bell crank.

9. The structure set forth in claim 8 and further comprising a relief valve connected to said one passage operative to relieve pressure therein at a pressure exceeding a predetermined value.

References Cited by the Examiner
UNITED STATES PATENTS

| | | | |
|---|---|---|---|
| 2,170,766 | 8/1939 | Rieger | 105—48 |
| 3,061,030 | 10/1962 | Shallenberg | 180—77 X |
| 3,217,826 | 11/1965 | Carter et al. | 180—77 |

A. HARRY LEVY, *Primary Examiner.*

LEO FRIAGLIA, *Examiner.*

E. E. PORTER, *Assistant Examiner.*